April 29, 1969   J. POUILLOUX ET AL   3,441,074
PNEUMATIC TYRES

Filed March 22, 1965

Inventors
J. POUILLOUX
A. MANRY

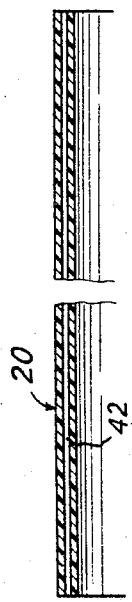

Inventors
J. POUILLOUX
A. MANRY
By Holcombe, Wetherill + Brisebois
Attorneys

United States Patent Office 3,441,074
Patented Apr. 29, 1969

3,441,074
PNEUMATIC TYRES
Jacques Pouilloux, Saint Gratien, and André Manry, Colombes, France, assignors to Pneumatiques, Caoutchouc Manufacture et Plastiques Kleber Colombes, Colombes, Seine, France, a French body corporate
Filed Mar. 22, 1965, Ser. No. 441,789
Claims priority, application France, Mar. 27, 1964, 969,117
Int. Cl. B29h 17/20
U.S. Cl. 152—361    11 Claims

ABSTRACT OF THE DISCLOSURE

Peripherally inextensible rubber rings for breaker layers of pneumatic tyres are made by winding a succession of layers of rubberised fabric on a contractible cylindrical drum. The fabric is composed of cords forming a small angle with the longitudinal axis of the layer and these angles alternate so that the cords are crossed in successive layers. The beginning of each layer is joined to the end of the layer and these joints are offset circumferentially. The cylindrical sleeve thus formed is cut perpendicularly to the axis of the drum to form a plurality of narrow continuous rings which are removed from one end of the drum. The angle may differ from one layer to the next. A layer of rubber mixture may be included and this may be outside to form a part of the tyre tread.

Figure 1:
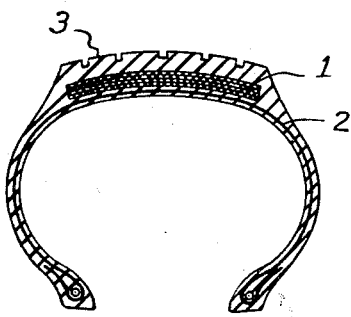

The apparatus for making these rings includes a set of radially movable spaced blades along a generatrix of the drum. It may also have a wire reinforced rubber sheath under tension and a roller to roll and compress the layers on the drum.

---

The present invention relates to the manufacture of pneumatic tyres, particularly tyre casings or outer covers of the type having flexible side walls and a reinforcement in the form of a breaker layer which is inextensible in the circumferential direction and is located between the carcass and the tread. This breaker layer normally comprises several superimposed layers, each of which is composed of textile or metal cords embedded in a layer of rubber, so as to run parallel to one another, the cords of said layers forming an angle with respect to the equatorial plane of the tyre.

The invention has for an object a method and an apparatus for manufacturing these breaker layers in an accurate, rapid and economical manner.

A method according to the invention consists in winding upon a cylindrical drum of the diameter of the breaker layers to be produced, the desired number of layers of rubberised fabric of great width so as to form a cylindrical sleeve, then in cutting into sections said cylindrical sleeve on the drum in order to form continuous rings of small width which are then removed from one of the ends of the drum.

This method allows for the rapid production with a minimum of waste, of breaker layers of exact dimensions both as regard diameter and width, which is an important element in the quality, accuracy and cost of tyres manufactured with breaker layers.

Where the breaker layers are to comprise several layers of fabric, the cords of which form with respect to the equatorial plane, an angle which is different or which alternates from one layer to another, the broad sheath with the cords, forming the angle in the desired direction are successively wound on the drum, the welds of each layer being offset in a circumferential direction so that, once the sleeve has been cut into sections, more balanced breaker layers are obtained.

The invention also relates to a modification of this method according to which a thick sleeve of a rubber mixture is formed about the sleeve of fabric coiled on the drum, the rubber sleeve and the fabric sleeve then being cut together in order to form composite continuous rings, the internal fabric parts of which constitute the breaker layer, and the external rubber part of which forms a portion of the tread of the tyres produced with these rings.

The invention also relates to the intermediate products such as the rings of rubberised material and the composite rings obtained by the use of the method according to the invention and used for the manufacture of tyres having a breaker layer. It also relates to tyres in which the breaker layer is constituted by the said rings.

The invention also relates to an apparatus for the use of this method, said apparatus comprising a rapid cylindrical drum externally covered with a flexible sheath, upon which are wound the layers of fabric and, if desired, the layers of rubber, and a cutting mechanism, the blades of which are spaced along a generatrix of the drum and mounted so that they are movable along the radial planes of the drum and are able to approach towards or move away from the drum in order to cut the coiled layers into sections.

The drum is preferably a drum of the type which is able to contract in order to reduce its external diameter and to facilitate removal of the sectioned breaker layers. In this case the flexible sheath surrounding the drum is preferably elastic and has, in the rest position, a diameter which is less than the assembly diameter of the tyre and tends to draw said drum back into a tyre extraction position in which its diameter is reduced.

The cutting mechanism may comprise fixed blades carried by arms mounted in spaced positions on a pivotable shaft parallel to a generatrix of the drum.

The apparatus may also comprise means for winding and locking the layers of fabric and rubber about the drum.

Figure 3:
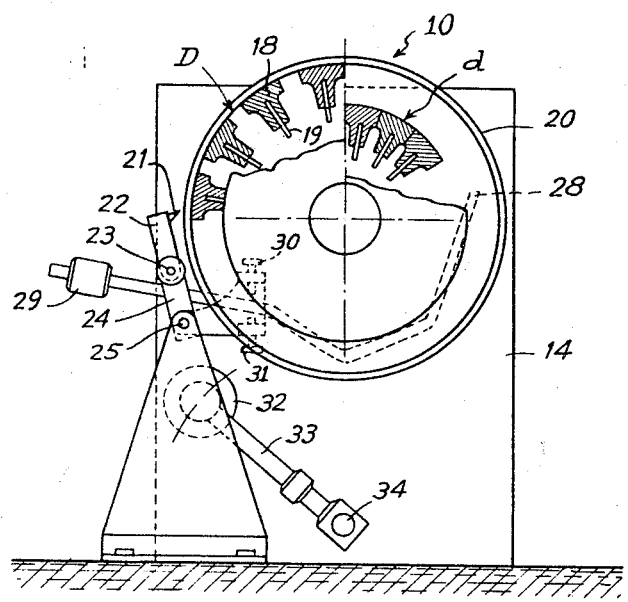
Figure 5:
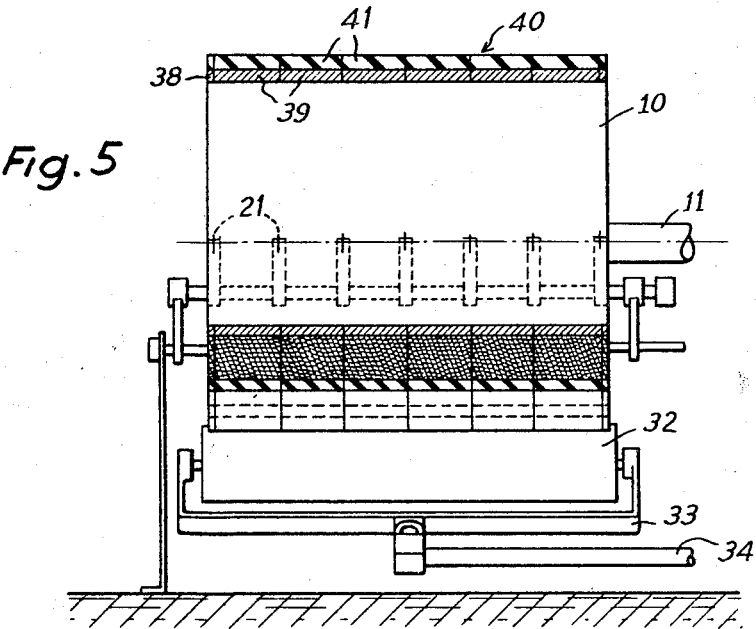
Figure 4:
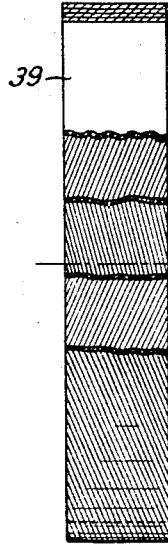
Figure 6:
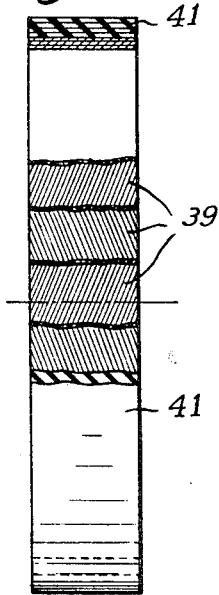

In order that the invention may be more clearly understood reference will now be made to the accompanying drawings which show one embodiment of apparatus according thereto and in which:

FIGURE 1 shows a cross-section through a tyre casing,

FIGURE 2 shows an elevational view in partial section of apparatus for making a breaker layer according to the invention for a tyre casing, FIGURE 3 shows a view from the left-hand side of the apparatus as shown in FIGURE 2, wherein the parts in section show certain details of the drum, FIGURE 4 shows a detailed view partially broken away, of a breaker layer constructed according to the invention, FIGURE 5 shows a partial view of the apparatus as shown in FIGURE 2 showing the assembly of the breaker layers with partions of the tread, FIGURE 6 shows a detailed view of a composite ring, and FIGURE 7 shows a partial view in section showing a modification of the flexible sheath of the drum.

Referring to the drawings, FIGURE 1 shows a tyre casing comprising breaker layers 1 inextensible in the circumferential direction, and is located between the carcass 2 and the tread 3.

In FIGURES 2 to 7 of the drawings, a cylindrical drum is generally designated by 10. It is mounted to overhang on a horizontal shaft 11 supported by bearings 12 and 13 of a frame 14 of the apparatus. This drum may be rotated by an electric motor 15 via a reduction gear 16, the output shaft of which carries a pulley which drives, by belts, a pulley 17 secured to the end of the shaft 11.

The drum 10 comprises a certain number of segments 18 which may be moved towards or away from the shaft 11 under the action of small rods 19 controlled by a suitable mechanism located within the drum. Said such mechanisms are well known, it is unnecessary to describe them in detail. The drum 10 may thus take up two positions, viz., a building position in which the segments 18 are radially separated from the shaft 11 and give to the drum an external diameter D corresponding to the diameter of the breaker layers to be produced, and a contracted position in which the segments are moved radially towards the shaft 11 so as to give to the drum a smaller external diameter d facilitating removal of the assembled breaker layers. The radial travel of the segments 18 is preferably adjustable so as to render the diameter D of the drum adjustable so that breaker layers of different diameters may be produced.

If desired, the drum 10 may be externally covered with a flexible, elastic sheath 20 which may be of rubber and which has in the rest position a diameter smaller than or at the most equal to the smaller diameter d of the drum. In the expanded position, this rubber sheath is thus circumferentially distended and tends to return towards the interior the segments 18 of the drum.

Behind the drum 10 is provided a cutting mechanism comprising a series of cutting blades 21 carried by arms 22 mounted at a distance from one another upon a shaft 23 parallel to a generatrix of the drum. This shaft is carried at each end by levers 24 mounted upon a shaft 25 pivotable in side supports 26 and 27 located on either side of the drum. The lever 24 located on the side of the frame 14 is secured to an operating lever 28, which passes under the shafts 11. This lever 28 extends in a rearwards direction and carries a balancing counterweight 29 tending to cause the cutting assembly 21 to pivot backwards in order to move it away from the drum. This movement is limited by an adjustable stop member 30 acting upon the lever 28, while another adjustable stop member 31 limits the approach of the blades to the drum.

Below and behind the drum is provided a roller 32 of approximately the same length as the drum, said roller 32 rotating freely about its shaft carried by a support 33. This support is mounted so as to be able to change direction on the end of a shaft 34 rotating in the bearings 35 and 36 of the frame. A jack 37 located within the frame allows the shaft 34 to pivot so as to apply the roller 32 against the drum.

The abovementioned apparatus is used to produce breaker layers for tyres in the following manner:

The drum is first placed in the expanded, or building position so that its external diameter D matches the internal diameter of the breaker layers to be produced, taking into account the thickness of the rubber sheath 20 surrounding said drum. A first layer of rubberised fabric composed of textile or metal wires, which is located on a distributor (not shown) is then wound around the drum in order to form one complete turn and the two ends of this layer are welded or otherwise secuerd together. The successive layers of fabric are wound in the same manner, preferable in such a manner that the joints are offset in a circumferential direction. This offsetting is, however, effected automatically for two successive layers when they are constituted of cords, forming with respect to the radial planes of the drum an angle which is different or which alternates from one layer to the next, since the welds are generally formed on the bias after the layers have been cut parallel to the direction of the cords constituting said layers. However even in this case case may also be taken to offset the joints of one pair of layers with respect to the joints of the pair of layers located above the first.

After winding each layer around the drum, the drum is rotated by means of the motor 15 while the roller 32 is pressed against the drum by the action of the jack 37. The roller allows successive layers to be pressed against each other so as to cause them to adhere together while removing any air contained between these layers.

When the desired number of layers has thus been wound around the drum, a cylindrical sleeve 38 is obtained, having a width corresponding to that of the drum (FIGURE 2). When the drum is rotating, the operator depresses the operating lever 28 in order to move the blades 21 towards the drum. These blades cut into the sleeve 38, thus cutting off a series of continuous rings 39, the width of which corresponds to the distance apart of the blades. The two end blades serve to trim off the edges of the sleeve 28. The penetration of the blades is limited by the stop member 31 to an extent which is just sufficient to cut completely through the sleeve 38 while cutting to a minimum into the flexible sheath 20. Once this cutting has been effected, the blades 21 are drawn back and the drum is contracted in order to allow the ring 31 to be successively removed from the free end of the drum in the form of individual breaker layers (FIGURE 4) which will be used in the building of the tyres.

As hereinbefore stated, the method used by this apparatus allows breaker layers of accurate dimensions, both as regards diameter and width, rapidly to be produced. Waste on a whole series of breaker layers is reduced to the trimming of the edges of the sleeve wound upon the drum.

According to a modification of the method herein described, tread portions of a tyre may be produced at the same time as the breaker layers 39. For this purpose several layers of fabric are first wound upon the drum 10 in order to form, as before, a cylindrical sleeve 38. A thick sleeve 40 of rubber mixture for the tread is then formed (FIGURE 5) above the sleeve 38, either by coiling a thick sheet of ruber of a length corresponding to the development of the sleeve 38, the ends of which are joined together, or by winding a sheet of thin rubber around for several turns in order to obtain the desired thickness of the sleeve 40. This last method avoids the difficulty of joining the ends of the rubber sheet together. These successive layers of fabric and rubber are rolled by means of the roller 32 in order to compress them and remove any air existing therebetween. The assembly of the two concentric sleeves 38 and 40 is then cut into individual rings by means of the cutting mechanism 21 as hereinbefore described. The drum 10 is contracted and these rings are removed from the free end of the drum. Composite rings (FIGURE 6) are thus obtained, the internal part 39 of which forms the breaker layer and the external part 41 of which forms a portion of the tread of the tyre, which is then assembled with these rings.

When using this modification of the method according to the invention, it is generally preferable that the thickness of the external part 41 be equal to that of the tread of the finished tyre, but this is not always necessary. The part 41 may be thinner and may only form a cushion which will subsequently be covered by a tread proper, in which case it may be desirable that the properties of the mixture of the part 41 be different from those of the tread. However in the latter case successive layers of rubber of different compositions and properties may be used to produce the sleeve 40.

This modification of the method according to the invention allows breaker layer tread assemblies to be produced rapidly, accurately, and with little waste. These assemblies have the advantage that they are themselves well-balanced and consequently aid the balanced construction of tyres produced using these rings.

The invention is of course not limited to the method and apparatus hereinbefore described by way of example, on the basis of which other modifications may be conceived. For example, in a modification of the rubber sheath 20 of the drum, said sheath may be reinforced with metal wires embedded in the thickness of the sheath and extending longitudinally from one edge of the sheath to the other. These wires do not resist the elastic expansion and contraction of the sheath but from a stop member limiting the penetration of the cutting blades 21 so as to prevent the sheath being completely cut through in the event of bad adjustment of the blades.

We claim:
1. Apparatus for manufacturing a breaker layer for a pneumatic tyre casing, said apparatus comprising a rigid cylindrical drum externally covered by a flexible sheath, the drum being axially fixed to receive circumferentially layers of appropriate material wound thereon, and a cutting mechanism comprising a plurality of spaced-apart blades located along a generatrix of said drum and mounted for movement in the radial planes of said drum towards and away from said drum for cutting said wound layers into sections.

2. Apparatus according to claim 1, wherein said drum is contractible in order to reduce its external diameter.

3. Apparatus according to claim 1, wherein said flexible sheath surrounding said drum is made from rubber and in the rest position has a diameter smaller than the assembly diameter of the drum in order to return the drum to an extraction position in which its diameter is reduced.

4. Apparatus according to claim 3, wherein said rubber sheath is reinforced with longitudinal metal wires.

5. Apparatus according to claim 1, and including means for rolling and compressing said layers wound upon said drum.

6. A method for manufacturing a peripherally inextensible breaker for pneumatic tyre casings, said method consisting in forming a succession of breaker layers by cutting predetermined lengths of broad rubberised fabric composed of cords forming a small angle with respect to the longitudinal direction of the fabric, said cutting being parallel to the direction of said cords and said lengths being such as to form one complete turn in the breaker layer, winding said lengths of fabric circumferentially and successively on a contractible cylindrical drum of the inner diameter of the breaker to be produced and securing the ends of each layer together, so as to form a cylindrical sleeve constituted by the succession of layers, in which the angles of the cords are alternated so that the cords are crossed from one layer to the next and with the joints of successive layer offset in a circumferential direction, cutting the cylindrical sleeve perpendicularly to the axis of the drum to form a plurality of narrow continuous rings, contracting the drum and removing said rings from one of the ends of the drum.

7. A method according to claim 6, wherein a thick sleeve of rubber mixture is formed about said fabric sleeve coiled upon said drum, the assembly of the rubber and fabric sleeve then being cut into sections in order to form composite continuous rings, the internal part of which forms the breaker layer and the external rubber part of which constitutes a portion of the tyre tread.

8. A method according to claim 7, wherein the cylindrical rubber sleeve is obtained by winding at least one sheet of rubber onto said drum, and joining the ends of said at least one sheet of rubber together.

9. A peripherally inextensible rubber ring suitable for a breaker layer for a pneumatic tyre casing, said ring comprising a succession of layers of rubberised fabric composed of cords forming a small angle with respect to the longitudinal direction of the layers, said angle of successive cords alternating so that the cords are crossed from one layer to the adjacent layer, the two ends of each layer being joined together along a line parallel to the cord, the joints being circumferentially offset.

10. A pneumatic tyre casing having a breaker layer according to claim 9.

11. A method according to claim 7, wherein said thick sleeve of rubber mixture is formed by winding a plurality of turns of a sheet of thin rubber around the drum.

References Cited

UNITED STATES PATENTS

| | | | |
|---|---|---|---|
| 1,544,546 | 7/1925 | Baker | 156—511 X |
| 1,708,129 | 4/1929 | Gammeter | 156—431 X |
| 2,367,821 | 1/1945 | Davis | 156—431 X |
| 2,814,331 | 11/1957 | Vanzo et al. | 156—128 |
| 2,935,117 | 5/1960 | Pfeiffer | 156—415 |
| 3,077,917 | 2/1963 | Appleby | 156—416 |
| 3,111,445 | 11/1963 | Pouilloux et al. | 156—415 |
| 3,151,013 | 9/1964 | Nebout | 156—126 X |
| 3,183,135 | 11/1965 | Berquist | 156—126 |

FOREIGN PATENTS 280,640 11/1927 Great Britain.

EARL M. BERGERT, *Primary Examiner.*

C. B. COSBY, *Assistant Examiner.*

U.S. Cl. X.R.

156—126, 416, 431, 511, 527